(12) United States Patent
Moon (10) Patent No.: US 11,627,722 B2
(45) Date of Patent: Apr. 18, 2023

(54) PET EXERCISE APPARATUS

(71) Applicant: CAM Corp., Daejeon (KR)

(72) Inventor: Jin Tae Moon, Daejeon (KR)

(73) Assignee: CAM Corp., Daejeon (KR)

( * ) Notice: Subject to any disclaimer, the term of this patent is extended or adjusted under 35 U.S.C. 154(b) by 0 days.

(21) Appl. No.: 17/596,924

(22) PCT Filed: Oct. 27, 2020

(86) PCT No.: PCT/KR2020/014730
§ 371 (c)(1),
(2) Date: Dec. 21, 2021

(87) PCT Pub. No.: WO2021/091146
PCT Pub. Date: May 14, 2021

(65) Prior Publication Data
US 2022/0312739 A1  Oct. 6, 2022

(30) Foreign Application Priority Data
Nov. 7, 2019 (KR) .................. 10-2019-0141845

(51) Int. Cl.
*A01K 15/02* (2006.01)

(52) U.S. Cl.
CPC .......... *A01K 15/027* (2013.01); *A01K 15/025* (2013.01)

(58) Field of Classification Search
CPC .... A01K 15/027; A01K 15/025; A01K 15/02; A01K 15/024; A01K 1/031; A01K 1/03;
(Continued)

(56) References Cited

U.S. PATENT DOCUMENTS 3,994,262 A * 11/1976 Suchowski ............ A01K 1/035
119/700
5,595,141 A * 1/1997 Udelle .................. A01K 15/024
119/706
(Continued)

FOREIGN PATENT DOCUMENTS

KR   10-2004-0014017 A   2/2004
KR      20-0465073 Y1    2/2013
(Continued)

OTHER PUBLICATIONS

International Search Report dated Feb. 3, 2021 in International Application No. PCT/KR2020/014730.

*Primary Examiner* — Peter M Poon
*Assistant Examiner* — Jeffrey R Larsen
(74) *Attorney, Agent, or Firm* — Saliwanchik, Lloyd & Eisenschenk (57) ABSTRACT

Proposed is a pet exercise apparatus including a rotary body which is formed in an erected cylindrical shape, has at least one open side surface, and is disposed to be rotatable, so as to stimulate a pet's curiosity and induce spontaneous exercise thereof without harming the pet's emotions or health. The rotary body includes a tube and a movable ball. The tube has a transparent tubular shape, is partially filled with liquid, and is disposed along the inner circumference thereof. The movable ball is positioned near the surface of the liquid filling the tube. The rotary body rotates according to the movement of the pet who chases after the movable ball, so that the position of the movable ball is changed by a change in the position of the surface of the liquid so as to continuously stimulate the pet's curiosity.

4 Claims, 11 Drawing Sheets

(58) Field of Classification Search
CPC .... A01K 29/00; A63B 2208/14; A63B 19/04; A63B 2208/12; A63B 21/4049; A63G 29/00
USPC .............................. 119/700, 702, 704, 701
See application file for complete search history.

(56) References Cited

U.S. PATENT DOCUMENTS

| | | | |
|---|---|---|---|
| 5,775,263 A * | 7/1998 | Richards | A01K 15/024 |
| | | | 119/706 |
| 2019/0191667 A1 | 6/2019 | Harada et al. | |
| 2020/0275636 A1* | 9/2020 | Kim | F21V 33/008 |

FOREIGN PATENT DOCUMENTS

| KR | 10-1988519 B1 | 6/2019 |
|---|---|---|
| KR | 10-2019-0113385 A | 10/2019 |
| KR | 10-2091231 B1 | 3/2020 |

* cited by examiner

PET EXERCISE APPARATUS

CROSS-REFERENCE TO RELATED APPLICATIONS

This application is the U.S. national stage application of International Patent Application No. PCT/KR2020/014730, filed Oct. 27, 2020, which claims the benefit under 35 U.S.C. § 119 of Korean Application No. 10-2019-0141845, filed Nov. 7, 2019 the disclosures of each of which are incorporated herein by reference in their entirety.

TECHNICAL FIELD

The present disclosure relates to a pet exercise apparatus and, more particularly, to a pet exercise apparatus that stimulates a pet's curiosity and induces spontaneous exercise thereof.

BACKGROUND ART

In recent years, as the standard of living has improved and family size declines, many people keep pets in order to improve their quality of life, such as to relieve boredom and loneliness, and obtain emotional stability.

Among pets, dogs and cats have higher level of intelligence and adaptability than other animals and have excellent ability to coexist and communicate with their owners, so they are recognized as family members towards whom the owners feel a sense of bonding and belonging rather than mere animals raised as a hobby or for fun.

Pets also feel close to the person who takes care of them, namely, the owner, and want to spend time with the owner. However, if the owner of the pet does not have enough time to devote themselves to their pets due to various tasks, pets will be left alone for longer periods of time and this can cause various issues such as depression, emotional instability, lack of exercise, and obesity.

Accordingly, toys and equipment that can help pets exercise and relieve stress while playing by themselves have appeared. An example is the exercise equipment and toy called a treadmill which is used to keep small rodents, such as hamsters and squirrels, as pets.

As for this treadmill-type exercise equipment, hamsters and squirrels instinctively ride it since they are active and energetic animals, but pets such as cats do not ride it even if the exercise equipment is installed because it doesn't attract their interest as it is. In this case, the owner has to constantly stimulate pet's curiosity with toys, etc. to prompt the cat to climb on the corresponding exercise equipment.

To solve these problems, Korea Patent No. 10-1988519 (hereinafter referred to as 'cited invention') disclosed a laser pointer that is installed to provoke the curiosity of pets to chase the laser beam. However, if the laser point used in the cited invention is used too often, there is a risk that your pet may react sensitively to other types of light, such as light from a lamp, and a risk of vision loss if the laser beam enters the pet's eyes directly.

DISCLOSURE

Technical Problem

Accordingly, the present disclosure is proposed to solve the above-described problems and an objective of the present disclosure is to provide a pet exercise apparatus that stimulates pet's curiosity without harming the emotions or health of pets and entices them exercise on their own.

Technical Solution

According to an embodiment of the present disclosure for achieving the objective as described above, provided is a pet exercise apparatus including a rotary body which is formed in an erected cylindrical shape, has at least one open side, and is disposed to be rotatable. The rotary body includes: a tube which has a transparent tubular shape, is partially filled with liquid, and is disposed along the inner circumference thereof; and a movable ball positioned near the surface of the liquid filling the tube.

The rotary body may have an installation groove by being dented from an inner circumferential surface formed in a wave shape, with the tube being accommodated in the installation groove.

The pet exercise apparatus may further include a pedestal disposed on a lower side of the rotary body to support the rotary body to rotate in place, wherein the rotary body may have a flange portion protruding outward along each side of edge thereof, and the pedestal may include: a rotary roller configured to be in contact with a circumferential edge of the flange portion and rotatably provided in a vertical direction; and a guide roller configured to be in contact with an inner side of the flange portion and rotatably provided in a horizontal direction.

The pedestal may include: a bottom portion provided with the rotary roller and the guide roller; and a first support sidewall configured to be erected on each side of the bottom portion so that the flange portion of the rotary body is located inside the first support sidewall, wherein the first support sidewall may have a first fixing hole formed through one point, wherein the flange portion may have a second fixing hole formed through at least one point at a position corresponding to the first fixing hole, and a fixing pin configured to be inserted into the first fixing hole and the second fixing hole to inhibit the rotary body from rotating may be provided.

In the rotary body, first magnets provided to be arranged at a first side along a circumferential surface of the rotary body and second magnets provided to be biased to a second side of the rotary body and having a same polarity as that of the first magnets are alternately disposed, wherein the apparatus may further include: an external toy mounted to the rotary body by a shaft so as to be positioned between the first magnets and the second magnets on an outside adjacent to the circumferential surface of the rotary body, the external toy having a third magnet with a polarity opposite to that of the first magnets and the second magnets at a position above the shaft point so that the external toy is able to repeatedly move left and right according to rotation of the rotary body.

Advantageous Effects

According to an embodiment of the present disclosure, the rotary body rotates according to the movement of the pet who chases after the movable ball, so that the position of the movable ball is changed by a change in the position of the surface of the liquid so as to continuously stimulate the pet's curiosity and entices the pet to exercise on its own. Also, since the movable ball that arouses the pet's curiosity does not harm the pet's emotions or health, the pet can safely use the apparatus of the present disclosure.

In addition, it is possible to inhibit noise from being generated by inhibiting the pet from using the apparatus of the present disclosure at night time by inhibiting the rotary body from rotating while, with an external toy, encouraging pets who do not even ride the rotary body to be active and play.

BEST MODE

Proposed is a pet exercise apparatus including a rotary body which is formed in an erected cylindrical shape, has at least one open side surface, and is disposed to be rotatable, so as to stimulate a pet's curiosity and induce spontaneous exercise thereof without harming the pet's emotions of health. The rotary body includes: a tube which has a transparent tubular shape, is partially filled with liquid, and is disposed along the inner circumference thereof; and a movable ball positioned near the surface of the liquid filling the tube. The rotary body rotates according to the movement of the pet who chases after the movable ball, so that the position of the movable ball is changed by a change in the position of the surface of the liquid so as to continuously stimulate the pet's curiosity.

The scope of the present disclosure is not limited to the embodiments described below, and various modifications can be made by those skilled in the art without departing from the technical gist of the present disclosure.

Hereinafter, a pet exercise apparatus according to the present disclosure will be described in detail with reference to FIGS. 1 to 11B attached thereto.

Figure 1:
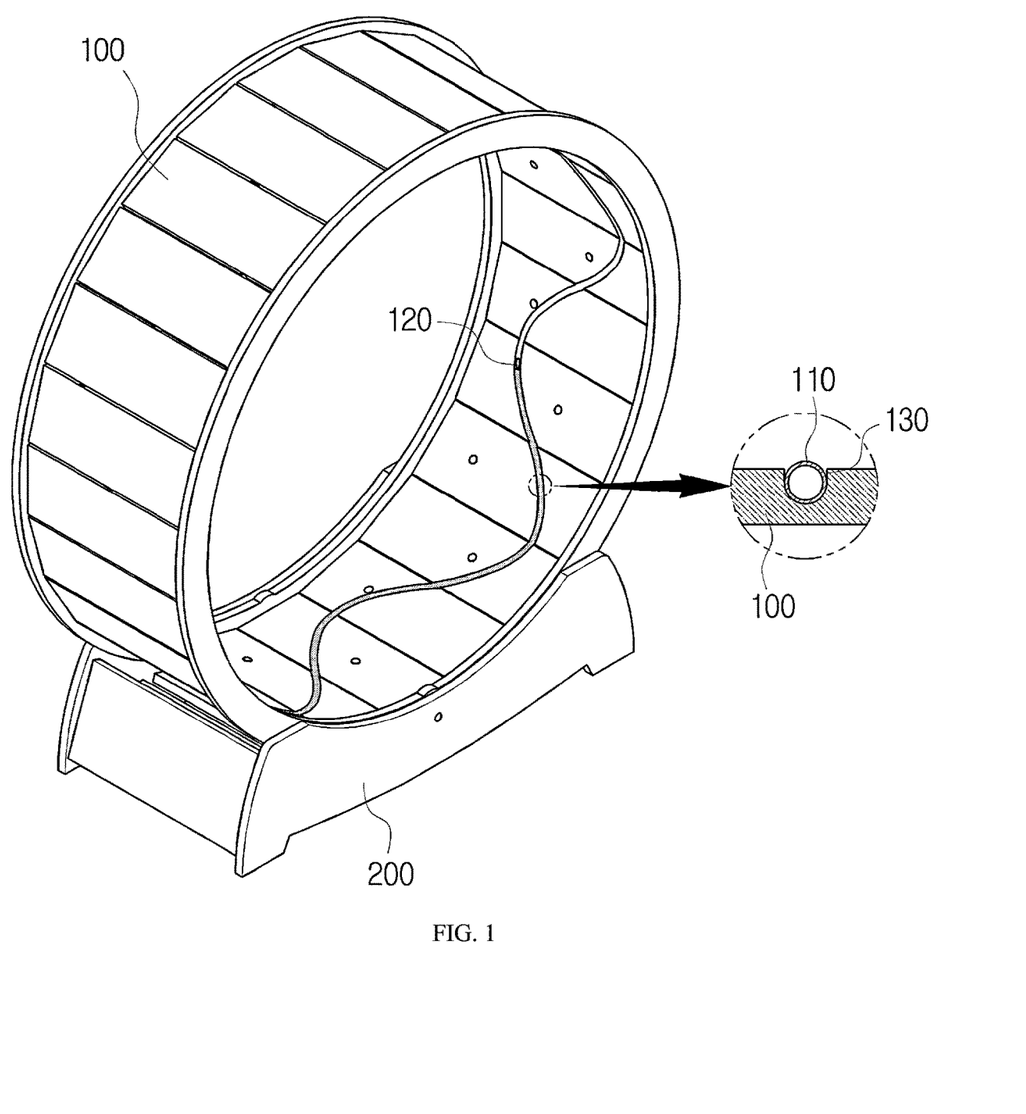
FIG. 1 is a perspective view showing the structure of a pet exercise apparatus according to the first embodiment of the present disclosure.

A pet exercise apparatus according to the present disclosure includes, as shown in FIG. 1, a rotary body 100 that forms an erected cylindrical shape and has at least one open side so that a pet A can enter and exit through the open side and be positioned inside. The rotary body 100 is rotatably provided, and although the rotary body 100 may be rotated while changing a position, it will be described below on the assumption that the rotary body 100 is provided to rotate in place.

Figure 2:
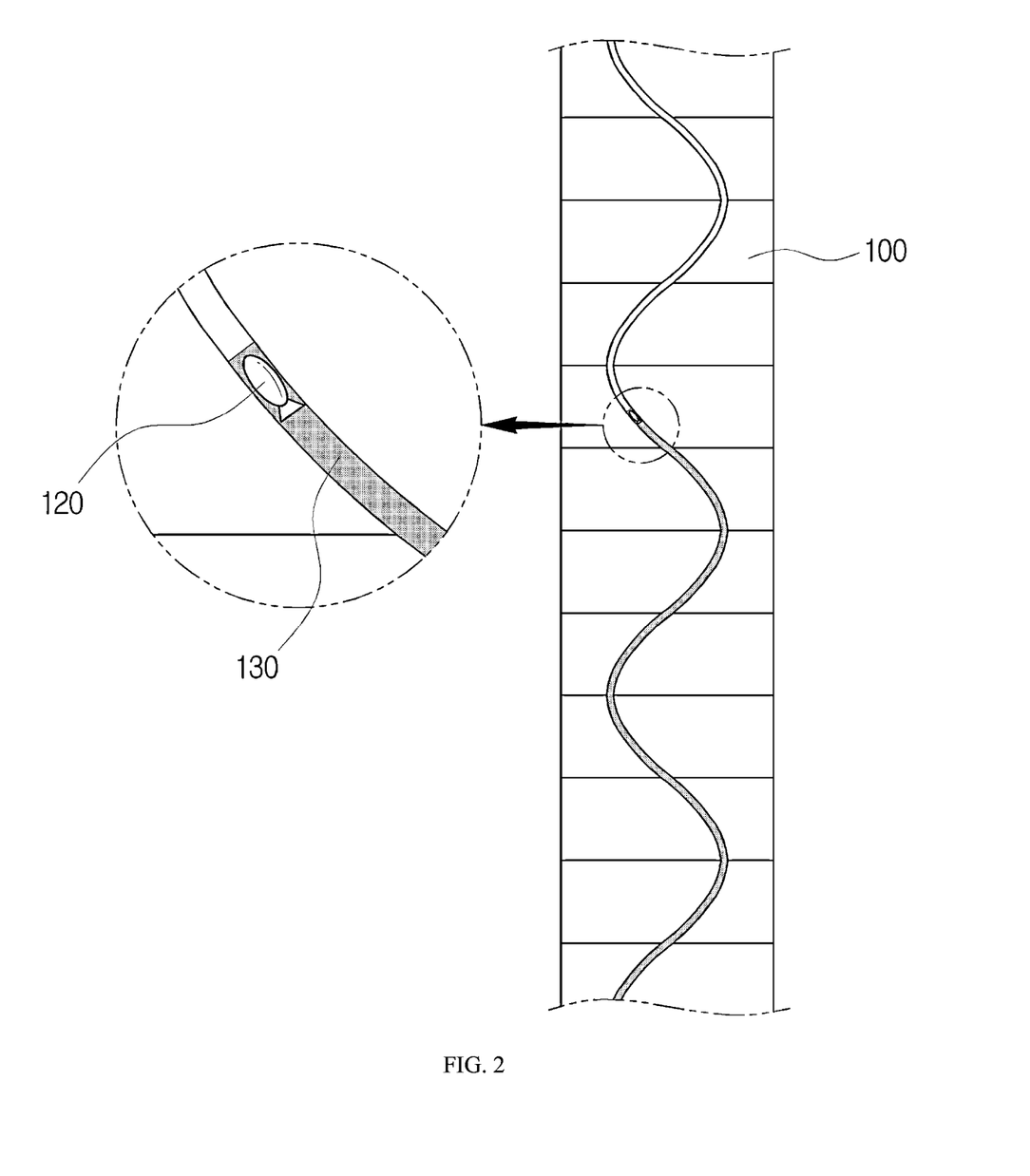
FIG. 2 is a view showing the state that a movable ball applied to the pet exercise apparatus is provided in a tube according to the present disclosure.

The rotary body 100 is provided with a tube 110 having a predetermined length and a tubular shape as shown in FIGS. 1 and 2 along the inner circumference, and the tube 110 is partially filled with liquid. It is preferable to fill the height of the liquid to be lower than the height corresponding to half of the rotary body 100, and it is desirable to use a liquid that is safe even if the pet A intakes it, such as water, saline, etc. Also, the tube 110 is transparently formed so that a movable ball 120 to be described later is visible from the outside.

The tube 110 is provided with the movable ball 120 located near the surface of the filled liquid. That is, the movable ball 120 is made of a material having buoyancy. The movable ball 120 may be provided in any one of the liquid surface formed in the tube 110 toward the front of the rotary body 100 and the liquid surface formed in the tube 110 toward the rear of the rotary body 100, as well as on both the front and rear liquid surfaces formed in the tube 110.

The movable ball 120 according to the present disclosure primarily serves to stimulate the curiosity of the pet A so that the pet A rides into the rotary body 100. Secondarily, it serves to arouse constant curiosity of the pet A so that the pet A continuously follows the movable ball 120 and does the exercise of walking or running by itself because when the pet A moves to catch the movable ball 120, the rotary body 100 is rotated, and as a result, the position of the movable ball 120 is changed as the position of the liquid surface is changed.

Figure 3A:
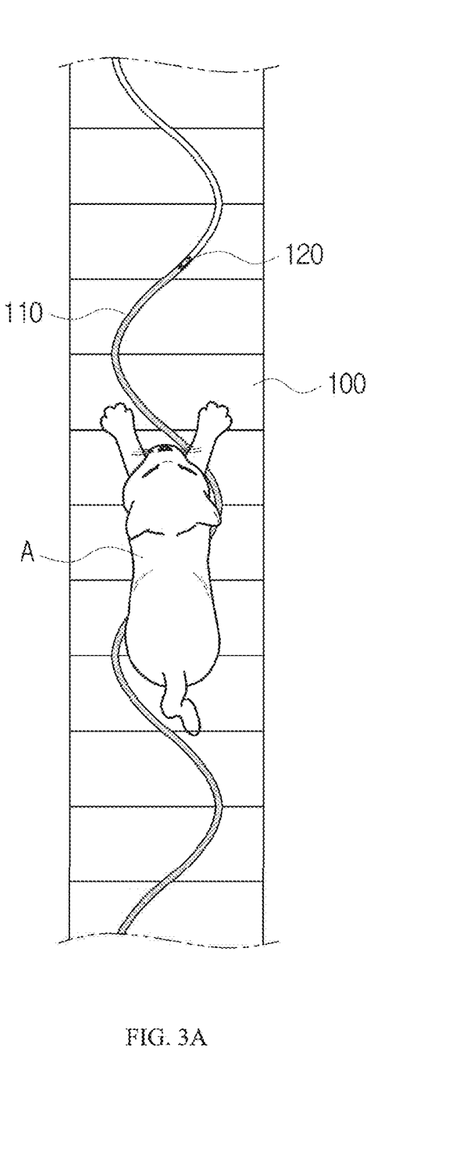
FIG. 3A and 3B are views showing that the position of the movable ball changes according to the movement of a pet using the pet exercise apparatus.
Figure 3B:
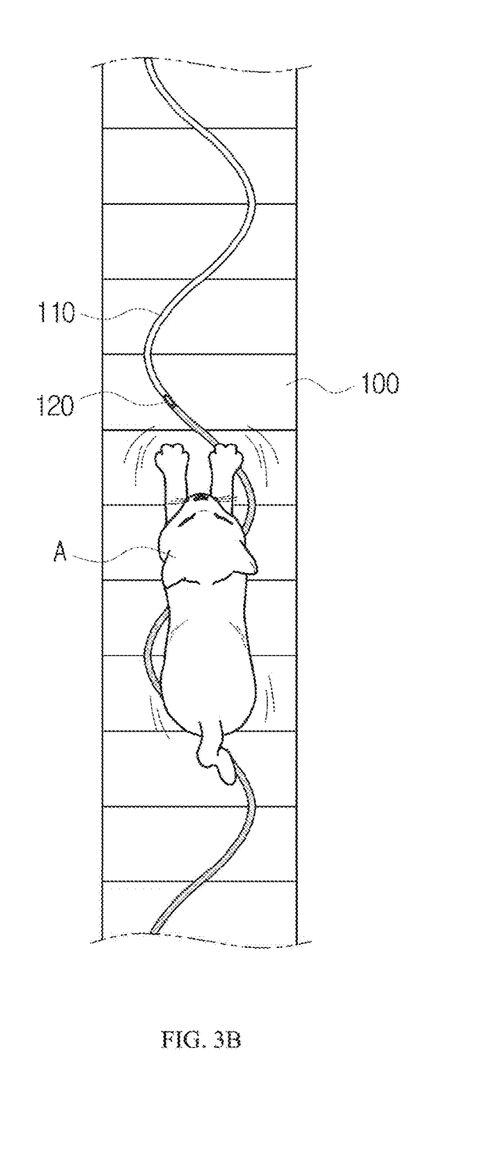

As a specific example, the movable ball 120 of the present disclosure, as shown in FIG. 3A, is spaced apart from the pet A by a predetermined distance when the pet A slowly chases it, whereas as shown in FIG. 3B, the movable ball 120 becomes adjacent to the pet A when the pet A quickly chases it, which means the position of the movable ball 120 is changed according to the movement of the pet A. Also, unlike the laser beam used to promote physical activity in the pet A in the related art, the movable ball 120 does not harm the pet's emotions or health, thus the pet A can safely use the apparatus of the present invention.

The tube 110 may be attached/coupled in a state protruding from the inner circumferential surface of the rotary body 100. However, since the tube 110 interferes with the pet A rotating the rotary body 100, an installation groove 130 in which the tube 110 is accommodated may be formed inside the inner circumferential surface of the rotary body 100 as shown in FIG. 1. The installation groove 130 may be formed so that the entire tube 110 can be accommodated inside, also considering the thickness of a pad 150 to be covered on the inner surface of the rotary body 100, the upper end of the tube 110 may be formed to protrude as much as the thickness of the pad 150 when accommodated in the installation groove 130.

The tube 110 may be provided on the inner circumferential surface of the rotating body 100 while forming various shapes, such as a straight shape, a zigzag shape, etc. However, it is preferable that the tube 110 to be provided in the form of a wave as shown in FIGS. 1 to 3 for a change in the position of the movable ball 120 according to the speed at which the pet A moves, smooth movement of the movable ball 120, and dynamic movement. Here, the installation groove 130 is formed in a wave shape along the inner circumferential surface of the rotary body 100.

In addition, the tube 110 may be forcibly fitted into the installation groove 130 to be fixed, attached to the installation groove 130 using an adhesive or the like, or provided so as not to be separated from the installation groove 130 using a binding member such as a cable tie.

Figure 4:
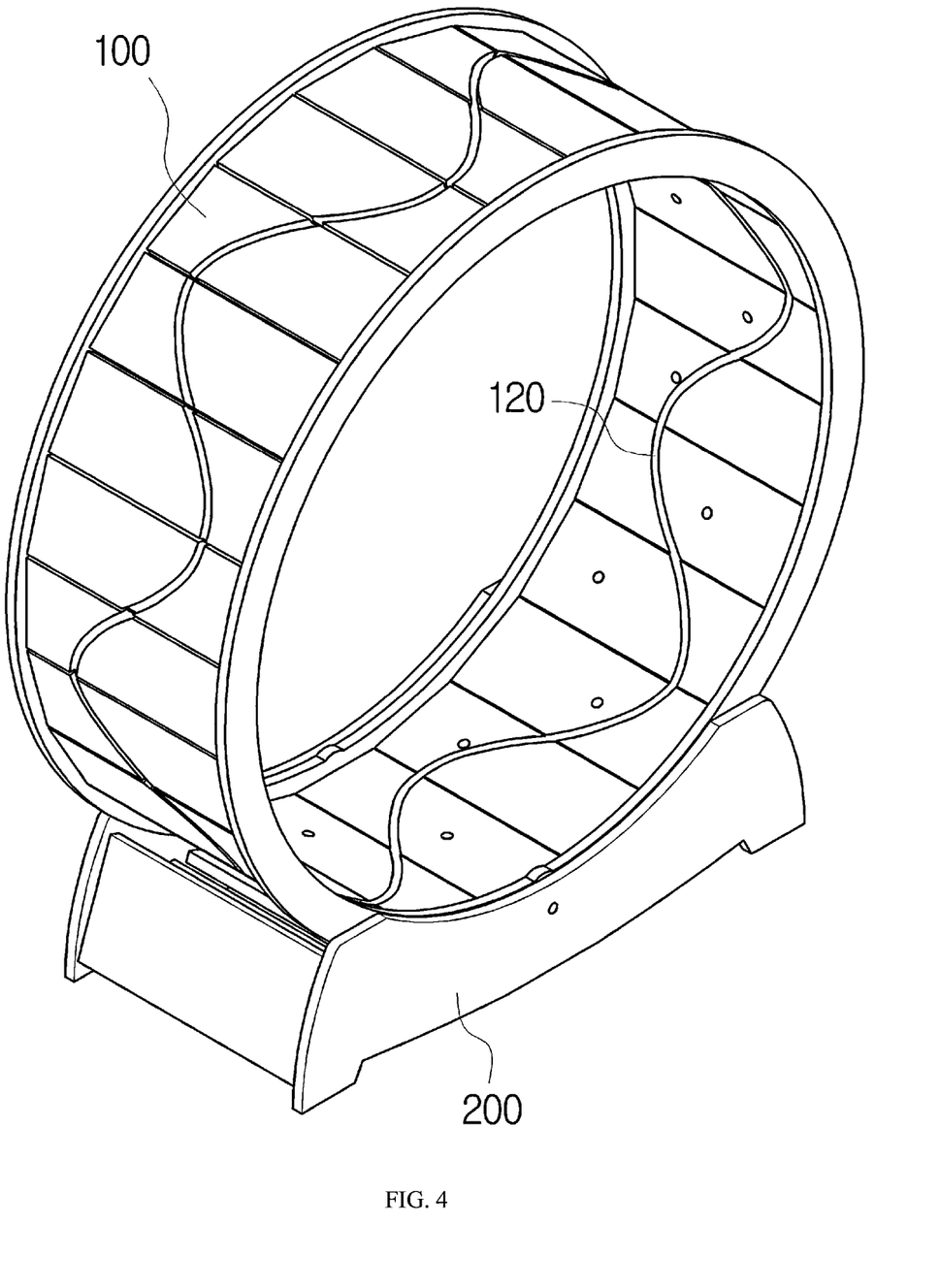
FIG. 4 is a perspective view showing the structure of a pet exercise apparatus according to the second embodiment of the present disclosure.

The tube 110, as described above, may not only be accommodated in the installation groove 130 incorporated into the inner circumferential surface of the rotary body 100, but also be accommodated in a hole formed to penetrate the circumferential surface of the rotary body 100 as shown in FIG. 4. Accordingly, not only for the pet A rotating the rotary body 100 from the inside of the rotary body 100, but also for the pet A located in the front and rear of the rotary body 100, curiosity may be stimulated by looking at the movable ball 120 that moves according to the rotation of the rotary body 100, and physical activity may be promoted.

Figure 5:
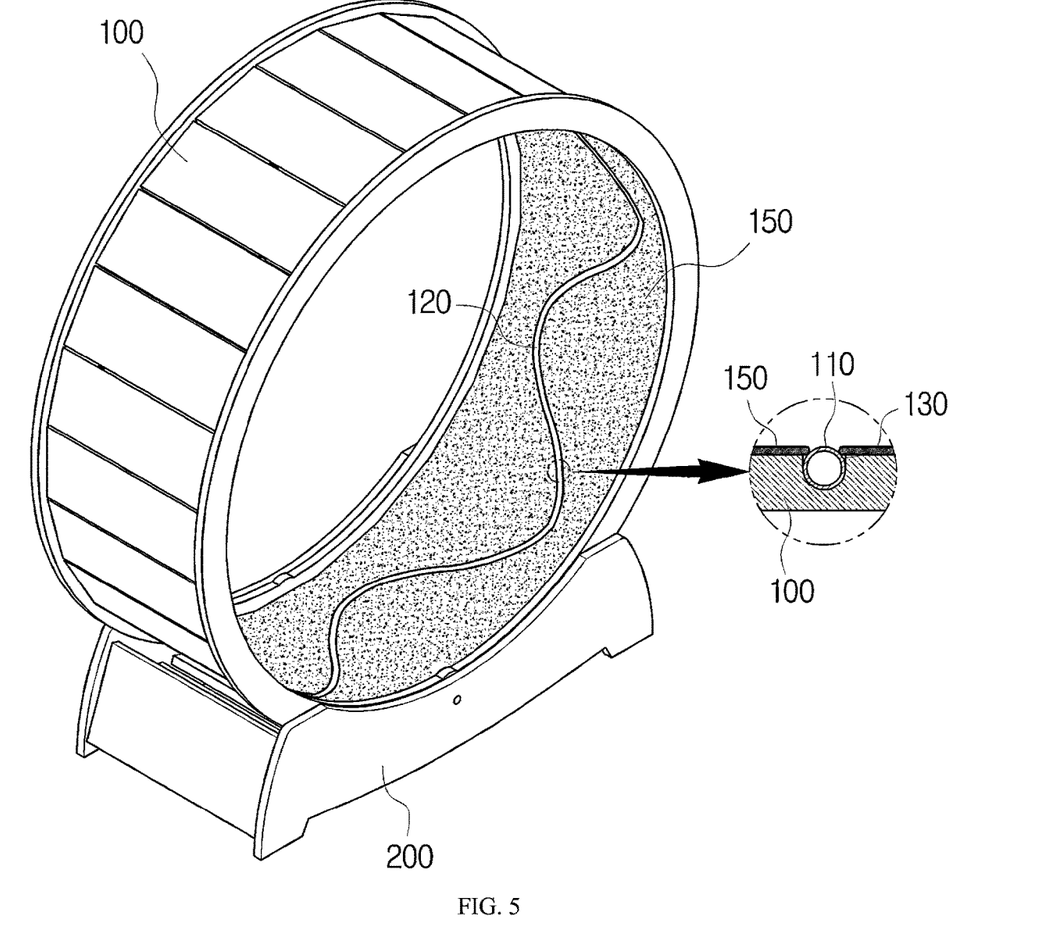
FIG. 5 is a perspective view showing the structure of a pet exercise apparatus according to the third embodiment of the present disclosure.

As shown in FIG. 5, the rotary body 100 may further include a pad 150 covering the inner circumferential surface. The inner circumferential surface of the rotary body 100 itself may be formed in a way the pet A can rotate the rotary body 100 without any inconvenience, but if not, the pad 150 inhibits slipping while providing a slight cushioning to make the pet feel comfortable and stable.

At this time, it is preferable that the pad 150 is bisected based on the installation groove 130 formed on the inner circumferential surface so as not to cover the installation groove 130, and in this case, it is preferable that the installation groove 130 is formed to allow the tube 110 accommodated to protrude as much as the thickness of the pad 150 in consideration of the thickness of the pad 150. Accordingly, the upper end of the tube 110 accommodated in the installation groove 130 and the upper surface of the pad 150 are located at the same height, thereby eliminating the inconvenience or risk of injury to the pet A due to the step. Also, the pad 150 is formed so that the end adjacent to the tube 110 is located inside the edge of the installation groove 130 as shown in FIG. 5, so as to partially cover the upper side of both edges of the tube 110. This is to inhibit inconvenience in using by the pet A by covering the gap with the pad 150 when the cross section of the tube 10 is accommodated in the circular installation groove 130.

Figure 6:
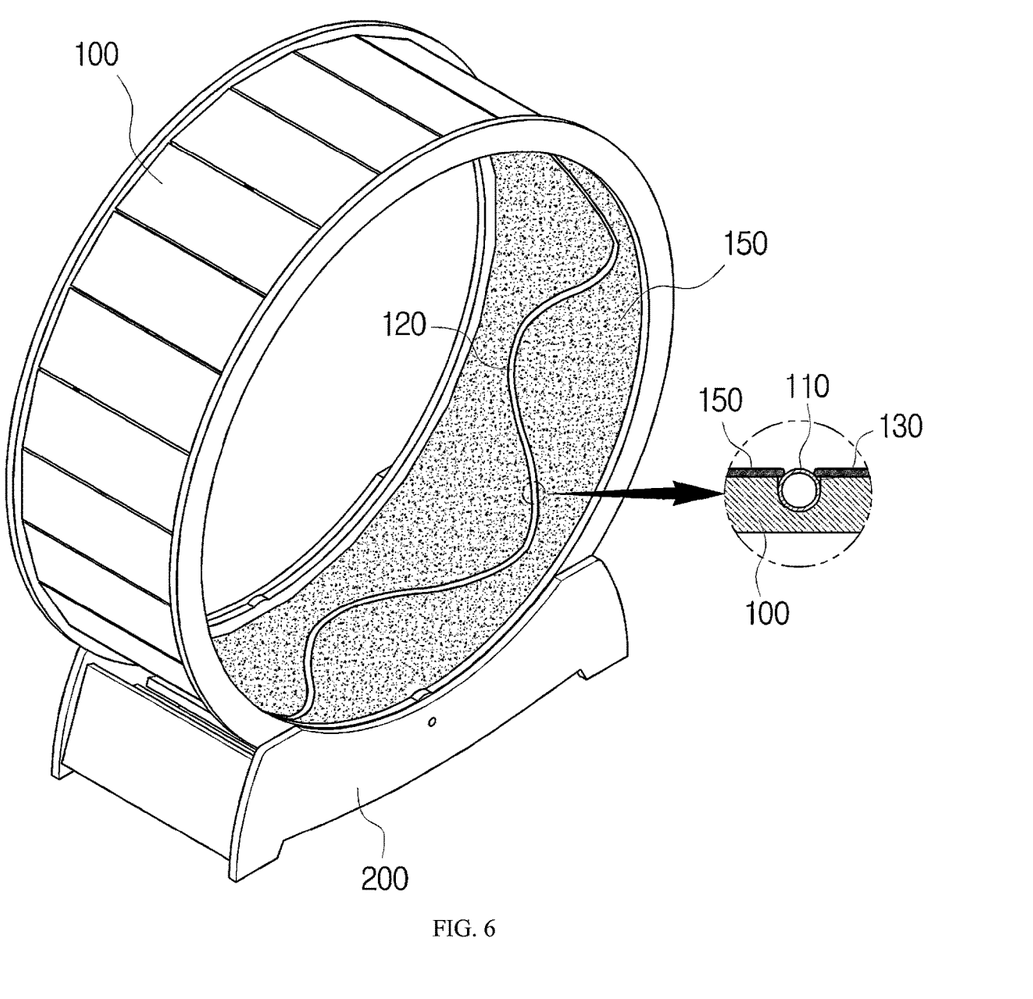
FIG. 6 is a view showing that a rotary body applied to the pet exercise apparatus according to the present disclosure can be fixed by a fixing pin.

A pet exercise apparatus according to the present disclosure may further include a pedestal 200 disposed on a lower side of the rotary body 100 to support the rotary body 100 to rotate in place as shown in FIG. 6. Here, the rotary body 100 may have a flange portion 140 protruding outward along both sides of edges.

Figure 7:
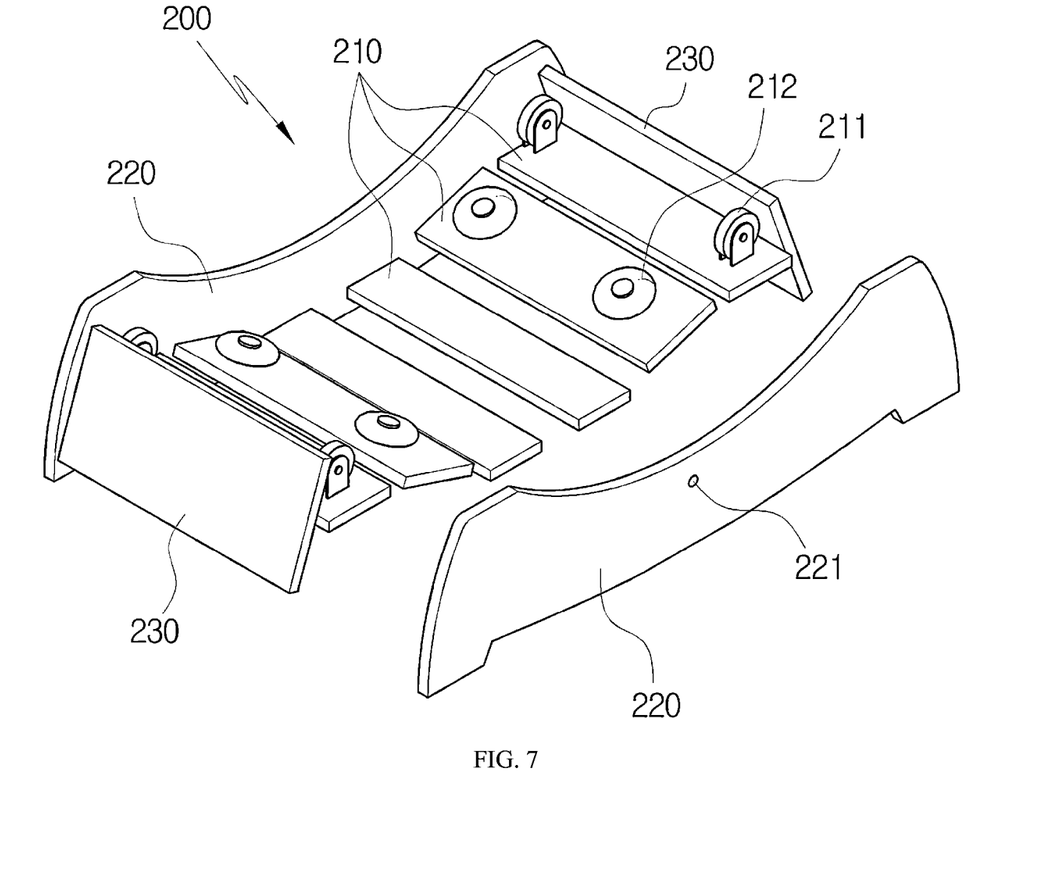
FIG. 7 is a partially exploded perspective view showing the structure of a pedestal applied to the pet exercise apparatus according to the present disclosure.
Figure 8:
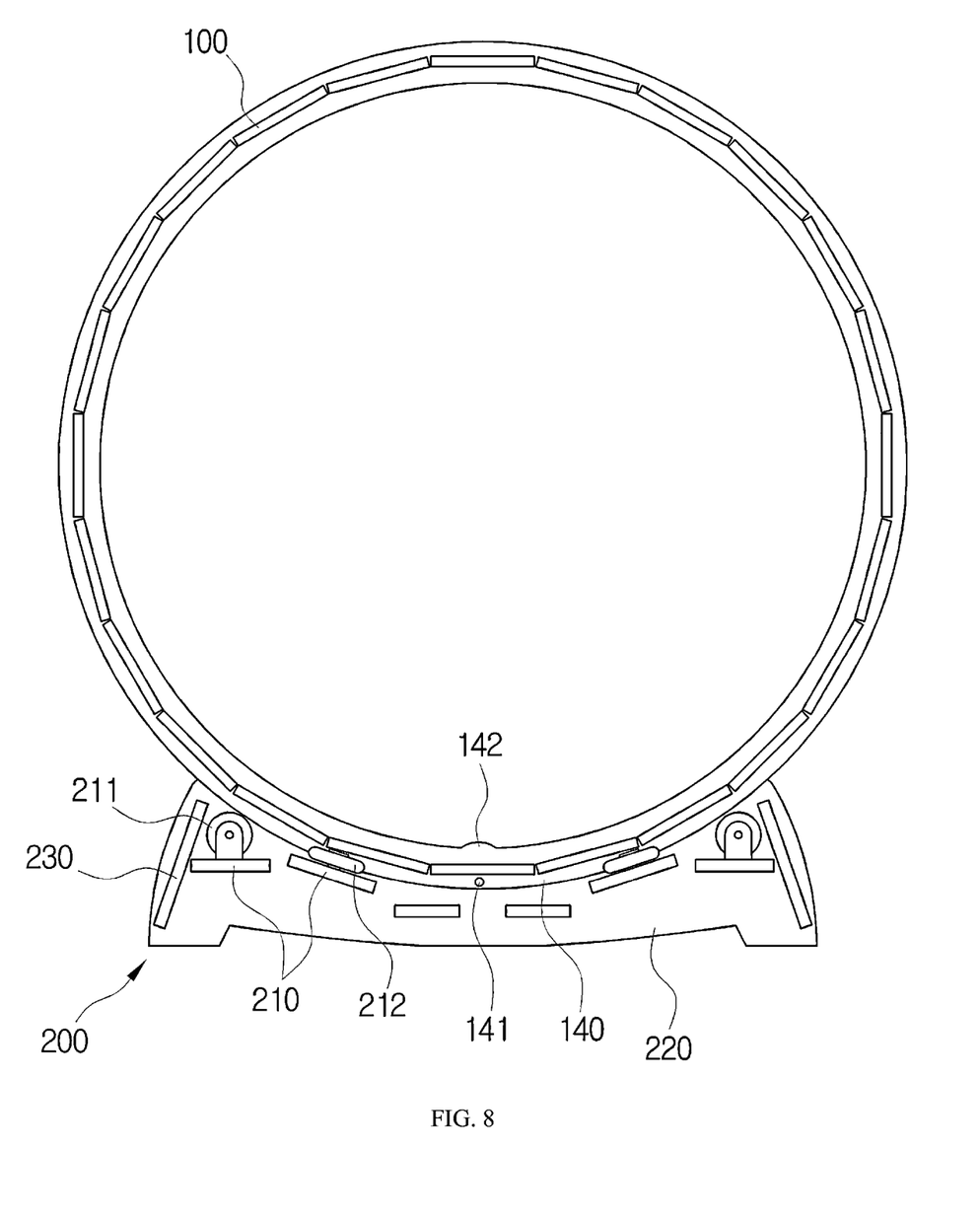
FIG. 8 is a partially exploded side view showing the structure of the pet exercise apparatus according to the present disclosure.
Figure 9:
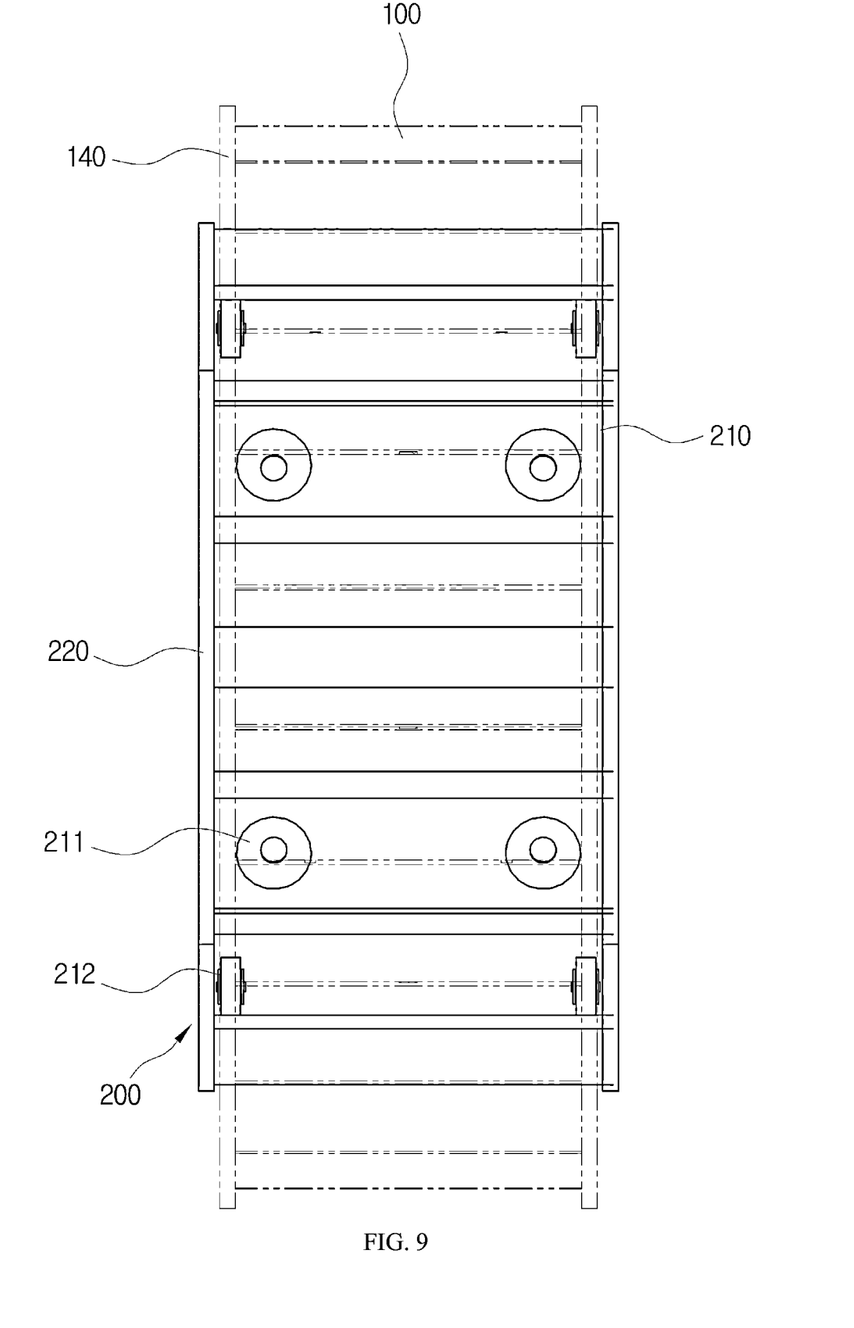
FIG. 9 is a plan view showing the state in which the rotary body is supported on the pedestal applied to the pet exercise apparatus according to the present disclosure.

The pedestal 200, as shown in FIGS. 7 to 9, may include: a rotary roller 211 configured to be in contact with an edge of the flange portion 140 and rotatably provided in a vertical direction; and a guide roller 212 configured to be in contact with an inner side of the flange portion 140 and rotatably provided in a horizontal direction. The rotary roller 211 is in contact with the rim of the flange portion 140 to support the rotary body 100 while allowing the rotary body 100 to rotate in place when the pet A moves. The guide roller 212 is in contact with the inner side of each flange portion 140 formed on both edges of the rotary body 100 and allows the rotary body 100 to rotate stably without shaking.

Specifically, the pedestal 200 may include: a bottom portion 210, as shown in FIG. 7, provided with the rotary roller 211 and the guide roller 212; and a first support sidewall 220 configured to be erected on both sides of the bottom portion 210. The pedestal 200 may further include a second support sidewall 230 configured to be erected at each end of the bottom portion 210.

The first support sidewall 220 may be formed so that the flange portion 140 formed on each side of the rotary body 100 is located inside, and as shown in FIG. 7, the first support sidewall 220 may have a first fixing hole 221 formed through one point. Here, the flange portion 140 may have a second fixing hole 141 formed through at least one point on edges to correspond to the first fixing hole 221 as shown in FIG. 8. Also, as shown in FIG. 6, a fixing pin 10 configured to be inserted into the first fixing hole 221 and the second fixing hole 141 to inhibit the rotary body 100 from rotating may be provided.

A user may prevent noise from being generated by inhibiting the pet from using the apparatus of the present disclosure at night time by inserting the fixing pin 10 into the first fixing hole 221 and the second fixing hole 141 thus inhibiting the rotary body 100 from rotating.

In addition, since the second fixing hole 141 formed in flange portion 140 is located on the inner side of the first support sidewall 220, it is difficult for the user to find the point where the second fixing hole 141 is formed from the outside, so in the flange portion 140, a fixing jaw 142 may be formed to protrude at an inner circumferential point above the point where the second fixing hole 141 may be formed as shown in FIGS. 6 and 8. The user rotates the rotary body 100 so that the point at which the fixing jaw 142 is formed coincides with the point at which the first fixing hole 221 of the first support side wall 220 is formed, then the rotary body 100 can be easily fixed with the fixing pin 10.

Figure 10:
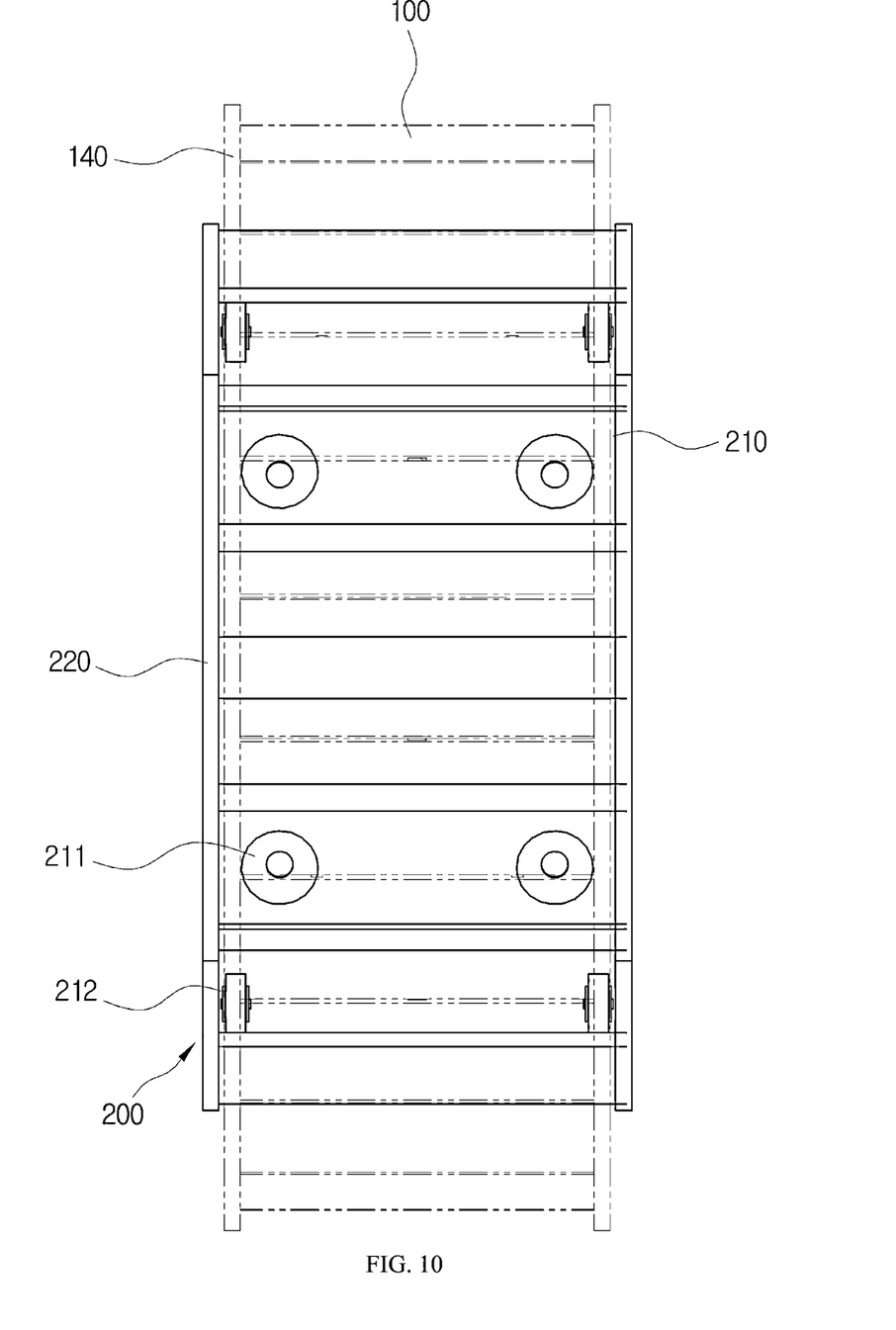
FIG. 10 is a perspective view showing the structure of a pet exercise apparatus according to the fourth embodiment of the present disclosure.

A pet exercise apparatus according to the present disclosure may further include an external toy 300 installed on an outer side of the rotary body 100 as shown in FIG. 10. The external toy 300 may have various shapes and may be provided in various locations. For example, as shown in FIG. 10, it may be configured to move according to the rotation of the rotary body 100 from the outside adjacent to the circumferential surface of the rotary body 100.

Figure 11A:
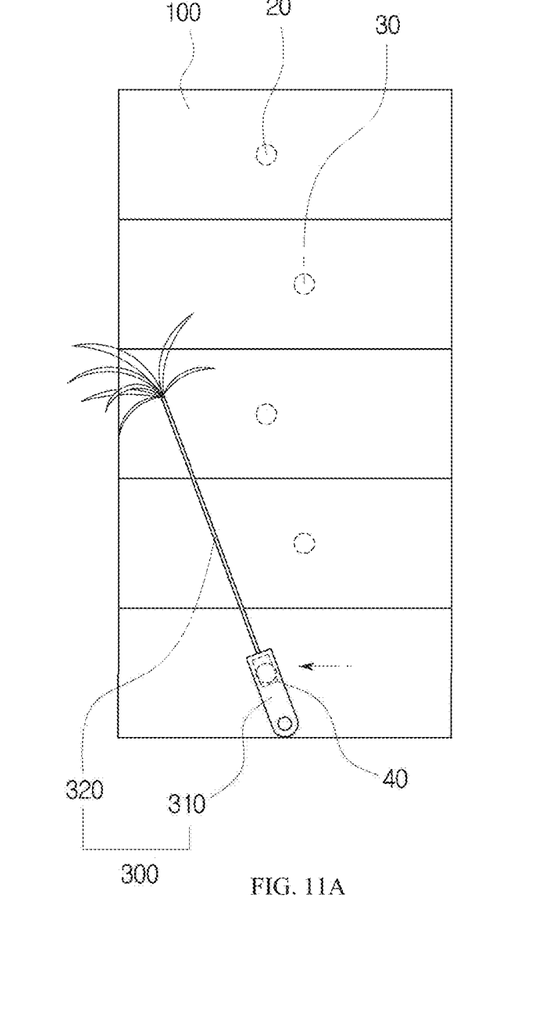
FIG. 11A and 11B are views showing the operation of an external toy applied to the pet exercise apparatus according to the present disclosure.
Figure 11B:
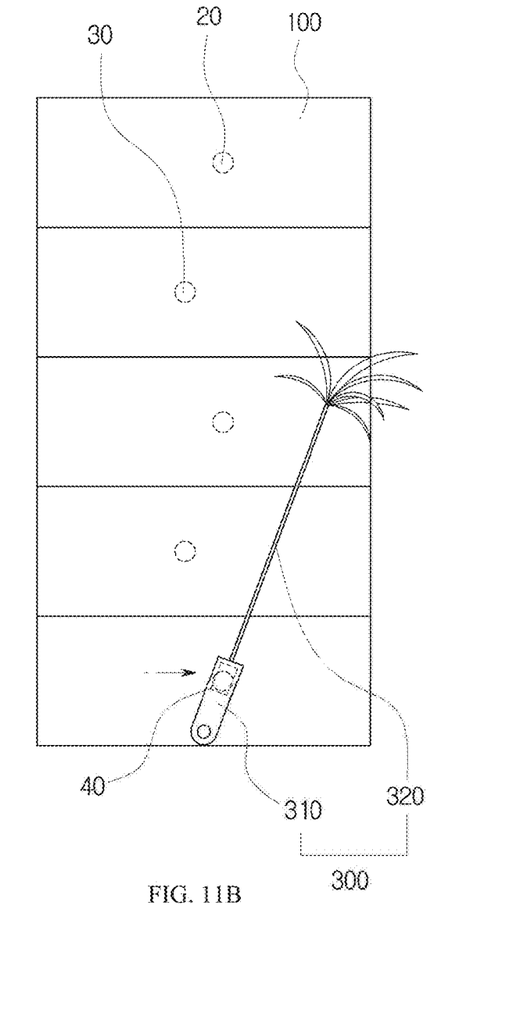

To this end, in the rotary body 100, first magnets 20 provided to be biased to one side along a circumferential surface and second magnets 30 provided to be biased to the other side may be alternately disposed as shown in FIGS. 10, 11A and 11B. The first magnets 20 and the second magnets 30 have a same polarity. Also, the external toy 300 may be mounted to the rotary body 100 by a shaft so as to be positioned between the first magnets 20 and the second magnets 30 on an outside adjacent to the circumferential surface of the rotary body 100, and may have a third magnet 40 having a polarity opposite to that of the first magnets 20 and the second magnets 30 at a position above the shaft point.

Accordingly, when the rotary body 100 is rotated, the external toy 300 is repeatedly moved left and right by the gravitational pull, and even the pet A who does not ride the rotary body 100 may also be motivated to engage in an activity by the external toy 300.

The external toy 300, specifically, may include a toy body 310 having the third magnet 40 on the upper part while the lower part is fixed, and a curiosity-arousing prop 320 that is coupled to the upper end of the toy body 310 to stimulate the curiosity of the pet A. The curiosity-arousing prop 320 may be formed in various shapes depending on the type and habit of the pet A. Also, the toy body 310 may be shafted to the pedestal 200 as shown in FIG. 10, more specifically, shafted to a second support sidewall 230 adjacent to the circumferential surface of the rotary body 100 among the components of the pedestal 200, and is preferably provided to be inclined so as not to come into contact with the rotary body 100.

DESCRIPTION OF REFERENCE NUMERALS

A: pet
10: fixing pin 20: first magnet
30: second magnet 40: third magnet
100: rotary body 110: tube
120: movable ball 130: installation groove
140: flange portion 141: second fixing hole
142: fixing jaw 150: pad
200: pedestal 210: bottom portion
211: rotary roller 212: guide roller
220: first support sidewall 221: first fixing hole
230: second support sidewall
300: external toy 310: toy body
320: curiosity-arousing prop

The invention claimed is:

1. A pet exercise apparatus, the apparatus comprising:
a rotary body (100) configured to be formed in an erected cylindrical shape with at least one open side; and
a pedestal (200) disposed on a lower side of the rotary body (100) to support the rotary body (100) to rotate in place,
wherein the rotary body (100) comprises: a tube (110) that has a transparent tubular shape and a circular cross section forming an upper side, a left edge, and a right edge within the erected cylindrical shape of the rotary body (100), is partially filled with liquid, and is disposed along and coupled to an inner circumference of the rotary body; and
a movable ball (120) positioned near a surface of the liquid filling the tube (110),
wherein the rotary body (100) and the tube (110) coupled thereto integrally rotate according
to a movement of a pet (A) who chases after the movable ball (120) from the inside of the rotary body (100), so that a position of the movable ball (120) is changed by a change in a position of the surface of the liquid, without separate power, so as to continuously stimulate curiosity of the pet (A),
wherein the rotary body (100) further comprises: an installation groove (130) by being dented from an inner circumferential surface thereof, with the tube (110) being accommodated in the installation groove (130) and provided in a form of a sinusoidal wave for a change in the position of the movable ball (120) according to a speed at which the pet (A) moves, thereby providing smooth movement of the movable ball (120), and dynamic movement, wherein the installation groove (130) is also provided in the form of a sinusoidal wave, configured and adapted for the tube (110) to be fitted into, fixed to, attached to, or to not be separated from the installation groove (130); and
a pad (150) bisected based on the installation groove (130) and covering the inner circumferential surface of the rotary body (100),
wherein the installation groove (130) is formed to allow the tube (110) accommodated to protrude as much as the thickness of the pad (150), and
wherein the pad (150) is formed so that an end adjacent to the tube (110) is located inside an edge of the installation groove (130), so as to partially cover an upper side of both the left edge and the right edge of the tube (110).

2. The pet exercise apparatus of claim 1, wherein the rotary body (100) has a flange portion (140) protruding outward along a side edge thereof, and
the pedestal (200) comprises: a rotary roller (211) configured to be in contact with a circumferential edge of the flange portion (140) and rotatably provided in a vertical direction; and
a guide roller (212) configured to be in contact with an inner side of the flange portion (140) and rotatably provided in a horizontal direction.

3. The pet exercise apparatus of claim 2, wherein the pedestal (200) comprises: a bottom portion (210) provided with the rotary roller (211) and the guide roller (212); and a first support sidewall (220) erected on each side of the bottom portion (210) so that the flange portion (140) of the rotary body (100) is located inside the first support sidewall (220),
wherein the first support sidewall (220) has a first fixing hole (221) formed through one point,
the flange portion (140) has a second fixing hole (141) formed through at least one point at a position corresponding to the first fixing hole (221),
the flange portion (140) has a fixing jaw (142) formed to protrude at an inner circumferential point above the second fixing hole (141), and
a fixing pin (10) configured to be inserted into both the first fixing hole (221) and the second fixing hole (141) to inhibit the rotary body (100) from rotating is provided,
so that when the fixing jaw (142) coincides with the first fixing hole (221), then the rotary body (100) can be fixed with the fixing pin (10).

4. The pet exercise apparatus of claim 1, wherein in the rotary body (100), first magnets (20) arranged at a first left side along a circumferential surface of the rotary body (100) and second magnets (30) arranged at a second right side along the circumferential surface of the rotary body (100) and arranged with a same polarity as that of the first magnets (20) are alternately disposed,
wherein the apparatus further comprises:
an external toy (300) shafted to the pedestal (200), thereby defining a shafted point positioned between the first magnets (20) and the second magnets (30) outside of and adjacent to the circumferential surface of the rotary body (100), the external toy (300) having a third magnet (40) arranged with a polarity opposite to that of the first magnets (20) and the second magnets (30), at a position above the shafted point so that the external toy (300) is able to repeatedly move left and right according to rotation of the rotary body (100).

* * * * *